United States Patent [19]

Schroeder et al.

[11] 4,027,043

[45] May 31, 1977

[54] SOLID ANIMAL FEED SUPPLEMENT

[75] Inventors: Jack J. Schroeder, Rolling Hills; Milo D. Appleman, Los Angeles, both of Calif.

[73] Assignee: Jack J. Schroeder, Rolling Hills, Calif.

[22] Filed: Oct. 28, 1975

[21] Appl. No.: 625,938

[52] U.S. Cl. .................................. 426/69; 426/74; 426/512; 426/658; 426/807
[51] Int. Cl.$^2$ ......................................... A23K 1/22
[58] Field of Search .............. 426/69, 74, 311, 335, 426/807, 658, 573, 512

[56] References Cited

UNITED STATES PATENTS

| 3,121,634 | 2/1964 | Kichline et al. | 426/74 |
| 3,420,672 | 1/1969 | Appleman | 426/69 |

*Primary Examiner*—R. B. Penland
*Attorney, Agent, or Firm*—Fulwider, Patton, Rieber, Lee & Utecht

[57] ABSTRACT

There is disclosed an animal feed supplement in solid, block form which is sufficiently palatable to permit its free choice feeding and which contains the proper proportions of molasses and/or fat to supply the energy requirements for maintenance and weight gain of the animals. The feed supplement blocks intended for consumption by ruminants also contain a high level of protein derived from nonprotein nitrogen as well as natural protein to function as a supplementary protein source. The feed supplement includes molasses in a major proportion, and solidifying ingredients comprising a phosphate and an oxide or salt of a metal such as aluminum magnesium or calcium, in quantities sufficient to solidify the supplement into solid, block form. The preferred metal ingredient is calcium as the oxide and/or sulfate. The composition can also contain an edible fat or oil and a fat emulsifying agent in sufficient quantity to prevent separation of the fat from the product. In the preferred embodiment, the emulsifying agent is starch which is employed in sufficient quantities to accelerate the hardening of the block. Other components which can, optionally, be included in the block include limited quantities of trace minerals, antibiotics and vitamins. The fat component can also contain an antioxidant to inhibit degradation of the product. The composition is prepared by admixing the ingredients in a manner which permits the in situ reaction of the phosphate source and the alkaline earth metal ingredient. Typically, the ingredients are heated and stirred to disperse the solid components and maintained at a moderate temperature, e.g., about 95 degrees F., for a period of approximately 30 minutes, at which time the mixture thickens substantially. The mixture is then poured into molds or packages and permitted to solidify, reaching a sufficient integrity in a period of from 8 to 10 hours to permit the products to be stacked on pallets for storage and shipping.

19 Claims, No Drawings

SOLID ANIMAL FEED SUPPLEMENT

BACKGROUND OF THE INVENTION

1. Field of the Invention

This invention relates to an animal feed supplement and, in particular, to an animal feed supplement in solid, block form.

2. Brief Description of the Prior Art

The value of molasses-containing supplements as a carbohydrate source in animal diets has been recognized for many years. Phosphoric acid has often been added to the molasses supplement to serve as a preservative and as a source of dietary phosphorous and urea has been added to ruminant feed supplements to supply nonprotein nitrogen. Fats have been included in these supplements as described in U.S. Pat. No. 2,793,952, and vitamins have also been used as described in U.S. Pat. No. 2,807,546. Most of the aforementioned animal feed supplements have been employed as a liquid which must be mixed with the animal's feed rather than permitting free choice feeding.

Attempts have been made to prepare animal feed blocks to supply the dietary requirements of animals. Typical of these are salt blocks, mineral blocks, protein blocks and molasses blocks. The feed blocks offer the advantage of free choice feeding of animals, thereby reducing the labor and expense otherwise incurred to mix the feed supplement with the animals' feed ration. These blocks have, heretofore, been manufactured by compressing ingredients into a molded shape or by evaporative heating of the ingredients. Both methods have disadvantages; the compressed blocks have limited contents of energy supplying ingredients such as molasses and fat, and heat sensitive vitamins and the like may be partially oxidized and/or decomposed by evaporative heating.

U.S. Pat. No. 3,420,672, discloses the formation of stable emulsions of edible fats in a molasses-containing feed supplement with a starch emulsifying agent. This patent also discloses that the use of relatively large quantities of the starch, e.g., around 6 percent, solidifies the compositions. It is desirable to reduce the quantity of starch necessary for solidification of the fat-containing molasses feed supplement and to impart a substantial water resistance to the compositions. Additionally, it is desirable to provide the proper proportions of edible fat and molasses for the energy requirements of the animals while maintaining sufficient palatability to permit the free choice feeding by animals. When the composition is intended for use with ruminants, the composition can also contain the necessary quantity of nonprotein nitrogen in the form or urea to supply the ruminants' dietary protein requirements.

BRIEF STATEMENT OF THE INVENTION

This invention comprises an animal feed supplement which contains a major proportion of molasses and solidifying components of a phosphate or phosphoric acid and a metal oxide or salt in sufficient quantities and proportions to solidify the product. Preferably, the composition also contains an edible fat or oil and a fat emulsifying agent to prevent separation of the fat or oil from the solid composition. Most preferably, starch is employed as the fat emulsifying agent since the starch enhances solidification of the composition. When the composition is intended for consumption by ruminants, a nonprotein nitrogen source such as urea can also be present in a sufficient quantity to supply the ruminants' protein requirements. The metal ingredients which can be employed are aluminum, calcium or magnesium oxides or salts. Of these, calcium is the preferred and calcium oxide and/or gypsum are most preferred.

The compositions are prepared by dispersing the solid ingredients into the liquid ingredients, e.g., dissolving the gypsum, calcium oxide, urea and starch into a mixture of phosphoric acid and molasses, heating the mixture to a temperature of about 95 degrees F. and, if a fat is to be included, adding the edible fat ingredient and agitating the mixture sufficiently to emulsify the fat. The mixture begins to thicken after a period of about 30 minutes, and is pumped into mold forms, typically into paper bags or other containers, for solidification. After a period of about 10 hours the packages are sufficiently solidified to permit stacking onto pallets for shipping and storage.

DESCRIPTION OF PREFERRED EMBODIMENTS

The animal feed supplement of this invention contains molasses as a major component. The molasses is present at a concentration of from 45 to about 93, preferably from 55 to about 80 weight percent in the feed supplement. Molasses is commercially available as an aqueous solution having a sugar content from about 60 to 85 Brix, and a consistency varying from a thin to a thick syrup. The molasses can be any sugar-containing molasses such as cane or backstrap molasses, beet molasses, converted molasses, wood sugar molasses, hydrosyrup, citrus molasses and the like. Molasses of a concentration of from 65 to about 85 Brix is preferred.

The phosphate which is employed as a solidifying component in the feed supplement can be any suitable feed-grade water soluble phosphate or phosphoric acid. Useful acids include electric furnace (white) phosphoric acid, or deflorinated wet-process (green) phosphoric acid, which can be of any commercially available grade such as the commonly available concentration range of from 50 to about 55 weight percent expressed as $P_2O_5$ corresponding to a concentration of orthophosphoric acid of about 70 weight percent. More concentrated acids can be employed if desired such as the anhydrous polyphosphoric acids which contain, in addition to orthophosphoric acid, higher polymers thereof including pyro and tripoly-phosphoric acids. Examples of water soluble phosphates which can be used are: ammonium or alkali metal phosphates, such as mono- or di-ammonium orthophosphate, tetrasodium pyrophosphate, mono-potassium orthophosphates, sodium hexametaphosphate, etc. Phosphorous anhydride ($P_2O_5$) can also be employed. The preparation of the feed supplement includes maintaining an aqueous suspension at moderately elevated temperatures and most of any phosphate polymers will hydrolyze to the ortho form during preparation of the supplement. Accordingly, orthophosphates or orthophosphoric acid are the preferred phosphate source. The phosphate source is employed in the feed supplement at a concentration from about .5 to about 5, preferably from 2.5 to about 4, weight precent expressed as $P_2O_5$.

The other solidifying component of the composition is an oxide, salt or mixture thereof of a metal such as aluminum, calcium or magnesium. Typical reactants include calcium oxide, magnesium oxide, aluminum oxide, calcium sulfate, e.g., gypsum, magnesium sulfate, calcium chloride, magnesium chloride, aluminum chloride, calcium carbonate, magnesium carbonate, as well as the aluminum, calcium and magnesium salts of low molecular weight organic acids, e.g., calcium acetate, aluminum acetate, propionate, calcium oxalate, magnesium citrate, etc. Of these, calcium oxide or calcium sulfate, e.g., gypsum, are the most preferred. It is also preferred that at least some of the metal additive be present as the oxide, e.g., at least about 10 and, preferably, at least about 25 percent of the calcium ingredient comprise the calcium oxide.

The amount of the metal ingredient which is employed can be from about 0.5 to about 5 weight percent, expressed as the oxide, and preferably is from about 0.8 to about 3.0 weight percent, base on the weight of the feed supplement. The proportions of the metal salt or oxide to the phosphate component can be such that the product preferably has an acidic pH value, typically from 3 to about 6.5 and most preferably from about 3.5 to about 6. The acidic pH can be obtained by an amount of the phosphate component which is greater than its stoichiometric proportion to the metal salt or oxide. The proportions of these ingredients can conveniently be expressed as a ratio of equivalent weights of phosphate to the metal which should be from about 1 to about 4. The solid blocks which are formed from the compositions have a tendency to become soft as the equivalent weights ratio of the phosphate to the metal is reduced substantially below about 1.0. Greater concentrations of the phosphate component can be employed, raising the ratio of phosphate to metal above about 4, if very low, acidic pH values are desired. Alternatively, another acid such as a mineral acid, e.g., sulfuric acid, or acetic acid can be added in the amount needed to adjust the pH to the desired value. It is believed that the soluble phosphate and added metal source, e.g., calcium oxide, function by at least partial reaction to form a metal phosphate. The exact nature and extent of the reaction is not presently known and these ingredients are, therefore, described herein as additives, recognizing that during the preparation of the product there may be a reaction product formed by a partial neutralization of the phosphoric acid or by a metathesis reaction between soluble phosphates and metal additives.

The fats and oils that can be employed in the invention as a source of animal edible fat are the edible water insoluble fats and oils from animal and vegetable sources which can be liquids or solids at room temperature. The compositions can contain from 2 to about 30, preferably from 5 to about 20 weight percent edible fat. These fats are various fatty acids such as stearic, palmitic, oleic linoleic, lauric, etc., and the mono-, di- or triglycerides of these fatty acids. Useful fats and oils can also include complex lipids such as the phospholipids, e.g., fatty acid esters of glycerol phosphate or lecithins, which also contain nitrogen bases such as choline. The fats are commonly identified by source and suitable fats which can be employed include the oils, tailings or residues of the following: soybean oil, cottonseed oil, sesame oil, olive oil, corn oil, tallow, fish oil, coconut oil, palm oil, etc. Preferably, relatively inexpensive sources of fats are employed such as the yellow grease compositions which are reclaimed restaurant fats and greases, acidulated soap stocks or acidulated fats and oils. The fat ingredient can also contain an antioxidant in an effective amount to inhibit oxidative degradation of the fat, e.g., from 0.01 to about 1 weight percent butylated hydroxyanisole, butylated hydroxytoluene, 4-hydroxymethyl-2, 6-di-tert bulytphenol, etc.

The composition can also contain a fat emulsifying agent and for this purpose any suitable cationic, anionic or nonionic surfactant can be employed. Examples of cationic surfactants include fatty amines, fatty amides, quaternary alkyl and aryl ammonium salts and hydrates, etc. Suitable anionic surfactants include the fatty acid gyceride sulfonates and fatty acid sulfonates such as sulfonated cottonseed oil, sulfonated sperm oil, sulfonated tallow, sulfonated aromatic hydrocarbons, e.g., benzene sulfonic acid, etc. Useful nonionic compounds include polyethylene oxide condensates of hydrophobic groups having a reactive hydrogen with from 10 to about 25 carbons condensed with from 2 to about 15 molecular weights of ethylene oxide. Examples of such materials include polyoxyethylene condensate with alkyl or alkenyl phenols, alkyl or alkenyl alcohols, long chain alkyl or alkenyl amines or amides, fatty acid partial esters of hexitans, etc. Free fatty acids and phospholipids which are present in some fat sources also function as emulsifying agents and no added emulsifying agent may be required with such fat sources.

The amount of the emulsifying agent employed for stabilizing the composition and preventing the separation of the fat ingredient during manufacture of the product or weeping of the fat ingredient from the solid block after its formation can be from about 0.05 to about 1 weight percent.

The preferred emulsifying agent employed in the feed supplement is starch. While pure starch is commonly a mixture of from 22–26 weight percent amylose and 74–78 weight percent amylopectin, the starch component can be any starchcontaining material including raw starch sources such as ground ceral products, e.g., flour, farina or meals of cerals such as corn, wheat, oats, barley, rice, sorghum, as well as flour of tubers such as potatoes, cassava and arrowroot or of sago palm pith. Preferably, the starch component is a commercially available starch product which is refined from the aforementioned raw starch sources by milling, aqueous extraction and drying. The starch component is, most preferably, pregelatinized by partial hydrolysis to increase its water solubility by heating an aqueous suspension of the starch component to form a gel or paste and drying of the product.

The raw starch component, refined starch or hydrolyzates therefrom such as pregelatinized starch can be used as the fat emulsifying agent in the preparation of the feed supplement of this invention. When a raw starch or nonhydrolyzed starch component is used, it may be necessary to prolong the heating of the aqueous mixture during preparation of the supplement, or, if desired, by separately heating an aqueous suspension of the starch component to effect gelatinization of the starch.

The starch component has been observed to enhance the solidification of the composition and to impart a temperature resistant storage stability to the solid products when used in concentrations in excess of the amount needed to stabilize the fat ingredient in the composition, which is the aforestated amount for the fat emulsifying agent. Accordingly, when the starch component is employed to stabilize the fat in the feed supplement product, the starch component is most preferably employed in an amount sufficient to provide a concentration of starch, calculated as pure starch from 0.5 to about 6 weight percent, preferably from about 2 to about 4 weight percent to enhance the solidification of solid feed supplement.

Other emulsifying and solidifying components which can be used include the gums, whether artificial or natural. Thus the various cellulose derivatives such as carboxymethylcellulose and alkali metal salts, e.g., sodium salt, hydroxyethylcellulose, hydroxypropyl methylcellulose, etc., the various alginates and their derivatives such as sodium alginate, propylene glycol alginate, etc., can be used. In addition such natural gums such as gum tricgacin, xanthan gum, locust bean gum, etc., may be used. Since starch is less expensive, the aforementioned gums are not the most preferred.

Other solidifying ingredients can be used although the starch, which can be in the form of flour, farina or meals of cerals, potatoes and the like, is preferred. Other materials which can be used include ground alfalfa, or finely ground inert solids such as powdered clays such as bentonite or kaolin, diatomaceous earth, etc.

The feed supplement can also contain a nonprotein nitrogen source such as urea, biuret or mono- or di-ammonium phosphate which supplies a part of the nitrogen dietary requirements for ruminants. The preferred material for a nitrogen source is urea which can be added in an amount from 2 to about 15 weight percent, preferably from about 5 to about 12 weight percent, based on the feed supplement. Generally, the feed supplement should not contain more than about 40 weight percent equivalent protein content from a nonprotein nitrogen source and the aforeindicated upper limit for the concentration of urea in the supplement corresponds to this maximum protein content. Since the molasses also contributes from 1 to about 3 weight percent nonprotein nitrogen, the maximum amount of urea can be reduced by the amount of nitrogen contributed by the molasses to the preferred, maximum 12 weight percent limit based on the feed supplement. A typical ruminant feed block would, therefore, contain from 5 to about 15, preferably from 7 to about 12 weight percent urea as a source of nonprotein nitrogen.

Various trace nutrients antibiotics and vitamins can also be incorporated in the feed composition, including vitamins A, C and E, tocopherols, as well as antioxidants for these materials such as ethoxyquin (1, 2-dihydro-6ethoxy-2, 2, 4-trimethyl quinoline). Other additives that can also be included in the composition are promazine hydrochloride, chlormadinone acetate, oxytetracycline, etc. Bloat inhibitors such as poloxaline can also be employed. The quantity and concentration of these materials which can be employed is preferably in accordance with established Environmental Protection Agency registrations to avoid the necessity for separate registration.

The following table sets forth the proportions of the ingredients in the composition of the invention:

Table I

| COMPONENT | BROAD | PREFERRED |
|---|---|---|
| 1. Molasses | 45 – 93% | 55 – 80% |
| 2. Fat | 0 – 30% | 5 – 20% |
| 3. Phosphate source (as $P_2O_5$) | 0.5 – 5% | 2.5 – 4% |
| 4. Metal oxide or salt (as MO) | 0.5 – 5% | 0.8 – 3% |
| 5. Emulsifier | 0.05 – 1.0% | |
| 6. Starch | 0 – 6% | 2 – 4% |
| 7. Equivalent Protein derived from non-protein nitrogen | 0 – 40% | 5 – 40% |
| 8. Minerals, vitamins | 0 – 1% | 0.1 – 0.5% |

The compositions can be prepared by admixing the liquid ingredients together and thereafter adding the dry ingredients individually or as a dry blended premix, stirring the mixture to disperse the dry ingredients and then adding the fat ingredient. The emulsifier for the fat ingredient can be incorporated in the mixture prior to or during the addition of the fat, e.g., liquid emulsifying agents can be added to the liquid components such as the molasses and phosphoric acid or the dry emulsifiers such as a pregelatinized starch can be premixed with the dry ingredients. Alternatively, the emulsifying agent, either liquid or solid can be premixed with the fat component and the mixture blended into the product. The dry ingredients of the composition typically comprise the metal oxide or salt, the trace minerals, urea and starch ingredients. The liquid ingredients comprise the molasses and phosphoric acid or aqueous solution of a phosphate salt.

The dry ingredients are dispersed in the molasses liquid by stirring for a period of from 2 to about 50 minutes. The degree of agitation during this mixing should be sufficient to form an intimate mixture of the ingredients without encountering degradation of the starch ingredient. Starches are slightly shear sensitive and, therefore, the agitation should be limited to avoid any starch degradation that would be observed by an undesirable decrease in the viscosity of the ingredients during mixing. After the solid ingredients have been dispersed in the liquid, the mixture is maintained at a temperature from ambient to about 125° F., preferably from 90 to about 110 degrees F. and the fat ingredient is then added while agitating the mixture and maintaining the temperature at the aforeindicated value. The composition will start to thicken within 20 to 30 minutes after the dry ingredients have been added to the liquid. As the mixture begins to thicken it is pumped into forms suitable for shaping of the product into the desired solid block form. Typically, solid blocks of from 30 to about 100 pounds, preferably from 50 to about 55 pounds are formed. These blocks can be cylindrical or cubic or any other suitable shape. In a preferred embodiment, the liquid ingredients are transferred into paper bags or corrugated cardboard boxes which are closed sealed and stored for a sufficient time to permit the liquid to solidify, typically for a period from 8 to about 10 hours. After solidification of the product the resultant packages can be handled, e.g., palletized and the like for shipment and storage.

The compositions of the invention have the advantage of solidification into solid, water-resistant blocks without the application of pressure or other molding steps. The products have a high degree of moisture resistance yet have sufficient palatability for free choice feeding. The compositions contain the proper proportion of fat-containing components to limit the free choice feeding and prevent over consumption by the animals.

The following examples will illustrate the practice of the invention and serve to demonstrate results obtainable thereby.

EXAMPLE 1

The commercial preparation of a feed supplement according to the invention was practiced in a large tank provided with an agitator and a pump to recycle the tank contents. To the tank was added 2,000 parts by weight of 79 Brix cane molasses. The molasses was stirred and 180 parts by weight of 70 weight percent orthophosphoric acid and 300 parts by weight of urea were added. The resultant mixture was agitated for 10 minutes with the recycle pump and agitator.

A premixed blend of dry ingredients including 90 parts by weight pregelatinized starch, 60 parts by weight gypsum, 6 parts by weight trace minerals and 45 parts by weight of lime was prepared and the premixture was slowly added to the tank contents. The tank contents were agitated for 5 minutes while maintaining the temperature at 90 degrees F. and, thereafter, 315 parts by weight of yellow grease was added and the tank contents were agitated and recycled for 5 minutes. Thereafter, the stirring was discontinued but the tank contents were pumped and recycled for an additional 8 minutes. During this period of mixing the tank contents thickened appreciably. The tank contents were pumped into corrugated boxes with a waterproof liner of sufficient size to provide 100 pound packages. The packages were closed, sealed and stored. The products solidified to sufficient firmness for stacking within 4 hours and reached their maximum firmness within one day.

EXAMPLE II

Preparation of a feed supplement according to the invention was practiced in a laboratory experiment. The feed supplement contained no starch or fat-emulsifying agents, other than free fatty acids and other surface active materials present in the fat additive. In the experiment, a cake mixer was employed at a slow revolution speed. To the bowl of the cake mixer was added 1,406 parts by weight of 79 Brix cane molasses and 120 parts by weight of 75 weight percent orthophosphoric acid. The mixture was stirred for one minute and a premixed blend of dry ingredients including 200 parts by weight urea, 40 parts by weight gypsum, 30 parts by weight lime and 4 parts by weight trace minerals was added to the mixer bowl and the mixing was continued for an additional 2 minutes.

A mixture of 100 parts by weight of yellow grease and 100 parts by weight of soya oil was prepared and slowly added to the contents of the mixing bowl. After addition of the fat ingredients, the mixing was continued for an additional 90 minutes at 100° F. and the bowl ingredients were then poured into plastic sample bags which were periodically inspected for solidification. It was found that the material solidified within one day and acquired its maximum firmness after three days.

EXAMPLE III

The laboratory procedure was repeated for preparation of a starch-containing feed supplement according to the invention. This supplement was prepared by the addition of 691 parts by weight of 79 Brix cane molasses and 42 parts by weight of 75 weight percent orthophosphoric acid to the laboratory mixer. The acid and molasses were mixed for about 1 minute and a premix of blended dry ingredients was added. The dry ingredients included 30 parts by weight of pregelatinized starch, 20 parts by weight gypsum, 22 parts by weight lime, 2 parts by weight trace minerals and 100 parts by weight of urea. The laboratory mixer bowl contents were stirred for a period of about 10 minutes at 75° F. after the addition of the dried premix and 100 parts by weight of a fat mixture of equal parts by weight of yellow grease and soya oil was then added. The mixing was continued for an additional 15 minutes and the feed supplement was then poured into plastic sample bags and periodically inspected for its solidification. The material solidified to a solid product of maximum firmness within on day.

EXAMPLE IV

The laboratory procedure was repeated for the preparation of a feed supplement according to the invention. The pregelatinized starch used in previous experiments was replaced with an equal weight quantity of starch and the gypsum was omitted as an ingredient. The molasses and phosphoric acid were blended and a premix of the dry ingredients comprising 200 parts by weight urea, 30 parts by weight lime and 4 parts by weight trace minerals was added to the molasses and phosphoric acid while stirring. The stirring was continued for 2 minutes at 100° F. and 200 weight parts of an equal weight mixture of yellow grease and soya oil was added. The mixing was continued for an additional 120 minutes and the ingredients were then poured into sample containers and inspected for firmness. The material solidified to its maximum firmness within one day.

EXAMPLE V

The laboratory procedure was repeated using a mixture of cane and beet molasses by the addition of 472 parts by weight of 79 Brixcane molasses, 319 parts by weight of 79 Brix beet molasses and 17 parts by weight of 75 weight percent orthophosphoric acid to the laboratory mixer. The ingredients were mixed for one minute and 40 grams of an ammonium phosphate solution comprising a mixture of mono- and di- ammonium orthophosphate ammonium and pyrophosphates of the designation "9-30-0" was added. The ingredients were mixed for an additional five minutes. The dry ingredients were added to the liquid contents by slowly adding each ingredient separately and stirring the resultant mixture for one minute before the next addition. The materials which were added in this fashion were: thirty parts by weight pregelatinized starch, 20 parts by weight gypsum, 10 parts by weight lime, 10 parts by weight magnesium oxide and 2 parts by weight trace minerals. Thereafter, 100 parts by weight of an equal weight mixture of yellow grease and soya oil was added. The feed supplement was stirred for an additional 15 minutes at 75°F. and then poured into sample containers. It was observed that the material solidified to its maximum firmness after one day.

EXAMPLE VI

The laboratory procedure was repeated with deletion of the urea component and substitution of calcium chloride for the lime as a soluble source of calcium. The procedure was followed by the addition of 470 parts by weight of 79 Brix cane molasses, 320 parts by weight of 79 Brix beet molasses and 10 parts by weight calcium chloride. The resultant mixture was stirred for two minutes and, thereafter, the dry ingredients were added separately with one minute of stirring between each addition. The following dry ingredients were added: 40 parts by weight of di-ammonium orthophosphate, 30 parts by weight pregelatinized starch, 20 parts by weight gypsum and 2 parts by weight trace minerals. Upon completion of addition of the solid ingredients, 100 parts by weight of an equal weight mixture of yellow grease and soya oil was added and the resultant mixture was stirred for 15 minutes at 75 degrees F. The blended ingredients were then poured into sample containers and stored. It was observed that the material solidified to its maximum firmness within a period of one day.

The preceding examples are set forth herein solely to illustrate the practice of the invention and demonstrate results obtainable thereby. It is not intended that the invention be unduly limited by the specific illustration. Instead, it is intended that the invention be defined by the ingredients and steps, and their obvious equivalents set forth in the following claims.

What is claimed is:

1. A solid animal feed supplement comprising molasses, and solidifying ingredients added thereto as a soluble phosphate or phosphoric acid in an amount from 0.5 to about 5 weight percent expressed as $P_2O_5$, and an oxide or salt of a metal selected from the class consisting of aluminum, magnesium, calcium or mixtures thereof, in an amount from 0.5 to about 5 weight percent, expressed as the oxide with a proportion of equivalent weights of phosphate to metal from 1 to about 4, sufficient to solidify said supplement into solid block form.

2. The supplement of claim 1 including from 2 to about 30 weight percent of an animal-edible fat.

3. The supplement of claim 2 including from 0.05 to about 1 weight percent of a fat emulsifying agent.

4. The supplement of claim 1 including from 0.5 to about 6 weight percent starch.

5. The supplement of claim 4 wherein said starch is present in an amount from 2 to about 4 weight percent.

6. The supplement of claim 5 wherein said starch is a pregelatinized starch.

7. The supplement of claim 6 wherein calcium oxide is added.

8. The supplement of claim 6 wherein a mixture of gypsum and calcium oxide is added.

9. The supplement of claim 1 including from 5 to about 40 weight percent equivalent protein derived from an added nonprotein source selected from the class consisting of urea, biuret and ammonium phosphate.

10. The supplement of claim 9 wherein said nonprotein nitrogen source is urea, present in an amount from 2 to about 15 weight percent.

11. A solid animal feed supplement comprising:
   a. molasses in an amount from 45 to about 93 weight percent;
   b. edible fat in an amount from 2 to about 30 weight percent;
   c. a fat emulsifier in an amount from 0.05 to about 1 weight percent; and
   d. solidifying ingredients added thereto as phosphoric acid in an amount from 2 to about 5 weight percent expressed as $P_2O_5$ and a metal ingredient selected from the class consisting of the oxide or salt of aluminum, calcium or magnesium in an amount from 0.5 to about 5 weight percent, expressed as the metal oxide, with the proportion of phosphate equivalent weight to metal equivalent weight being from 1 to about 4, sufficient to solidify said feed supplement into solid block form.

12. The supplement of claim 11 including from 5 to about 20 weight percent of an animal-edible fat.

13. The supplement of claim 11 including from 0.5 to about 6 weight percent starch.

14. The supplement of claim 13 wherein said starch is present in an amount from 2 to about 4 weight percent.

15. The supplement of claim 14 wherein said starch is a pregelatinized starch.

16. The supplement of claim 15 wherein said calcium ingredient is added as calcium oxide.

17. The supplement of claim 15 wherein said calcium ingredient is added as a mixture of gypsum and calcium oxide.

18. The supplement of claim 11 including from 5 to about 40 weight percent equivalent protein derived from an added nonprotein source selected from the class consisting of urea and ammonium phosphate.

19. The supplement of claim 18 wherein said nonprotein nitrogen source is urea, present in an amount from 2 to about 15 weight percent.

* * * * *

REEXAMINATION CERTIFICATE (479th)
United States Patent [19]

Schroeder et al.

[11] B1 4,027,043

[45] Certificate Issued Apr. 8, 1986

[54] SOLID ANIMAL FEED SUPPLEMENT

[75] Inventors: Jack J. Schroeder, Rolling Hills, Calif.; Milo D. Appleman, Los Angeles, Calif.

[73] Assignee: Jack J. Schroeder, Rolling Hills, Calif.

Reexamination Request:
No. 90/000,611, Aug. 22, 1984

Reexamination Certificate for:
Patent No.: 4,027,043
Issued: May 31, 1977
Appl. No.: 625,938
Filed: Oct. 28, 1975

[51] Int. Cl.$^4$ ............................................. A23K 1/22
[52] U.S. Cl. ........................................ 426/69; 426/74; 426/512; 426/658; 426/807
[58] Field of Search ................... 426/69, 74, 623, 311, 426/630, 355, 636, 512, 807, 573, 658

[56] References Cited

U.S. PATENT DOCUMENTS

| | | | |
|---|---|---|---|
| 3,121,634 | 2/1964 | Kichline et al. | 426/74 |
| 3,246,336 | 4/1966 | Baribo et al. | 426/807 X |
| 3,420,672 | 1/1969 | Appleman | 426/69 |

FOREIGN PATENT DOCUMENTS

| | | |
|---|---|---|
| 263695 | 6/1964 | Australia . |
| 438073 | 1/1972 | Australia . |
| 460390 | 8/1973 | Australia . |
| 479368 | 5/1974 | Australia . |
| 170505 | 3/1974 | New Zealand . |
| 1356954 | 6/1974 | United Kingdom . |

OTHER PUBLICATIONS

Calcium Chloride in Liquid Feed Supplements by Silvano Grosso, K. E. Nelson, Dow Chemical U.S.A. (1973).
Grosso et al., "Calcium Chloride in Liquid Feed Supplements" NFIA Counter Oct. 14–16 (1973), pp. 115–129.
The Merck Index, Merck & Co. Publishers, Rahway, NJ (1968), pp. 193–195.

*Primary Examiner*—R. B. Penland

[57] ABSTRACT

There is disclosed an animal feed supplement in solid, block form which is sufficiently palatable to permit its free choice feeding and which contains the proper proportions of molasses and/or fat to supply the energy requirements for maintenance and weight gain of the animals. The feed supplement blocks intended for consumption by ruminants also contain a high level of protein derived from nonprotein nitrogen as well as natural protein to function as a supplementary protein source. The feed supplement includes molasses in a major proportion, and solidifying ingredients comprising a phosphate and an oxide or salt of a metal such as aluminum magnesium or calcium, in quantities sufficient to solidify the supplement into solid, block form. The preferred metal ingredient is calcium as the oxide and/or sulfate. The composition can also contain an edible fat or oil and a fat emulsifying agent in sufficient quantity to prevent separation of the fat from the product. In the preferred embodiment, the emulsifying agent is starch which is employed in sufficient quantities to accelerate the hardening of the block. Other components which can, optionally, be included in the block include limited quantities of trace minerals, antibiotics and vitamins. The fat component can also contain an antioxidant to inhibit degradation of the product. The composition is prepared by admixing the ingredients in a manner which permits the in situ reaction of the phosphate source and the alkaline earth metal ingredient. Typically, the ingredients are heated and stirred to disperse the solid components and maintained at a moderate temperature, e.g., about 95 degrees F., for a period of approximately 30 minutes, at which time the mixture thickens substantially. The mixture is then poured into molds or packages and permitted to solidify, reaching a sufficient integrity in a perior of from 8 to 10 hours to permit the products to be stacked on pallets for storage and shipping.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF THE REEXAMINATION, IT HAS BEEN DETERMINED THAT:

Claims 1, 7, 8, 11, 16 and 18 are determined to be patentable as amended.

Claims 2-6, 9, 10, 12-15, 17 and 19 dependent on an amended claim are determined to be patentable.

New claims 20-24 are added and determined to be patentable.

1. A solid animal feed supplement comprising molasses and solidifying ingredients added thereto as a soluble phosphate or phosphoric acid in an amount from 0.5 to about 5 weight percent expressed as $P_2O_5$ and [an] *calcium* oxide [or salt of a metal selected from the class consisting of aluminum, magnesium, calcium or mixtures thereof,] in an amount from 0.5 to about 5.0 weight percent, expressed as the oxide with a proportion of equivalent weight of phosphate to metal from 1 to about 4, sufficient to solidify said supplement into solid block form.

7. The supplement of claim 1 [6] wherein [calcium] *magnesium* oxide is also added.

8. The supplement of claim 1 [6] wherein a mixture of gypsum and calcium oxide is added.

11. A solid animal feed supplement [comprising] *consisting essentially of:* a. molasses *of 65 to 80 Brix* in an amount from 45 to about 93 weight percent;
b. edible fat in an amount from 2 to about 30 weight percent;
c. a fat emulsifier in an amount from 0.05 to about 1 weight percent; and
d. solidifying ingredients added thereto as phosphoric acid in an amount from 2 to about 5 weight percent expressed as $P_2O_5$ and a metal ingredient selected from the class consisting of the oxide or salt of [aluminum,] calcium [or magnesium] in an amount from 0.5 to about 5 weight percent, expressed as the metal oxide, with the proportion of phosphate equivalent weight to metal equivalent weight being from 1 to about 4, sufficient to solidify said feed supplement into *a water resistant,* solid block form.

16. The supplement of claim *11* [15] wherein said calcium ingredient is added as calcium oxide.

18. The supplement of claim *16* [11] including from 5 to about 40 weight percent equivalent protein derived from an added nonprotein source selected from the class consisting of urea and ammonium phosphate.

*20. The supplement of claim 11 wherein calcium and magnesium oxides are added as solidifying ingredients.*

*21. A water-resistant, solid animal feed supplement consisting of molasses of 65 to 80 Brix in an amount from 45 to about 90 weight percent, and solidifying ingredients added thereto as a soluble phosphate or phosphoric acid in an amount from 0.5 to about 5 weight percent expressed as $P_2O_5$ and an oxide or salt of a calcium or mixtures thereof, in an amount from 0.5 to about 5.0 weight percent, expressed as the oxide with a proportion of equivalent weight of phosphate to metal from 1 to about 4, sufficient to solidify said supplement into solid block form.*

*22. The supplement of claim 21 wherein calcium oxide and phosphoric acid are added as said solidifying ingredients.*

*23. The supplement of claim 22 wherein magnesium oxide is also added as a solidifying agent.*

*24. The supplement of claim 23 wherein gypsum is also added as a solidifying agent.*

* * * * *